Figure 4:
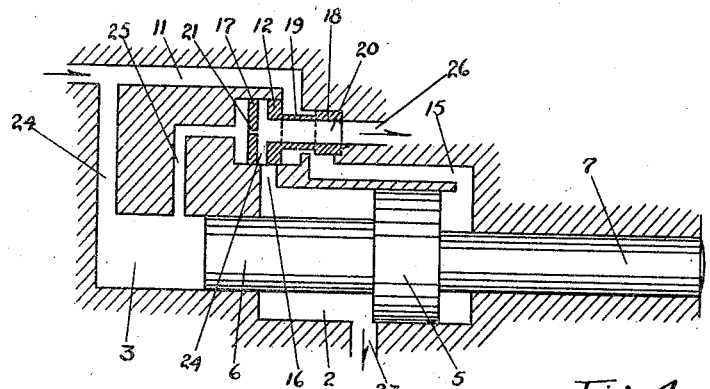

F. M. SLATER.
VALVE FOR PERCUSSIVE TOOLS.
APPLICATION FILED MAY 25, 1917.
1,289,285.
Patented Dec. 31, 1918.
2 SHEETS—SHEET 1.
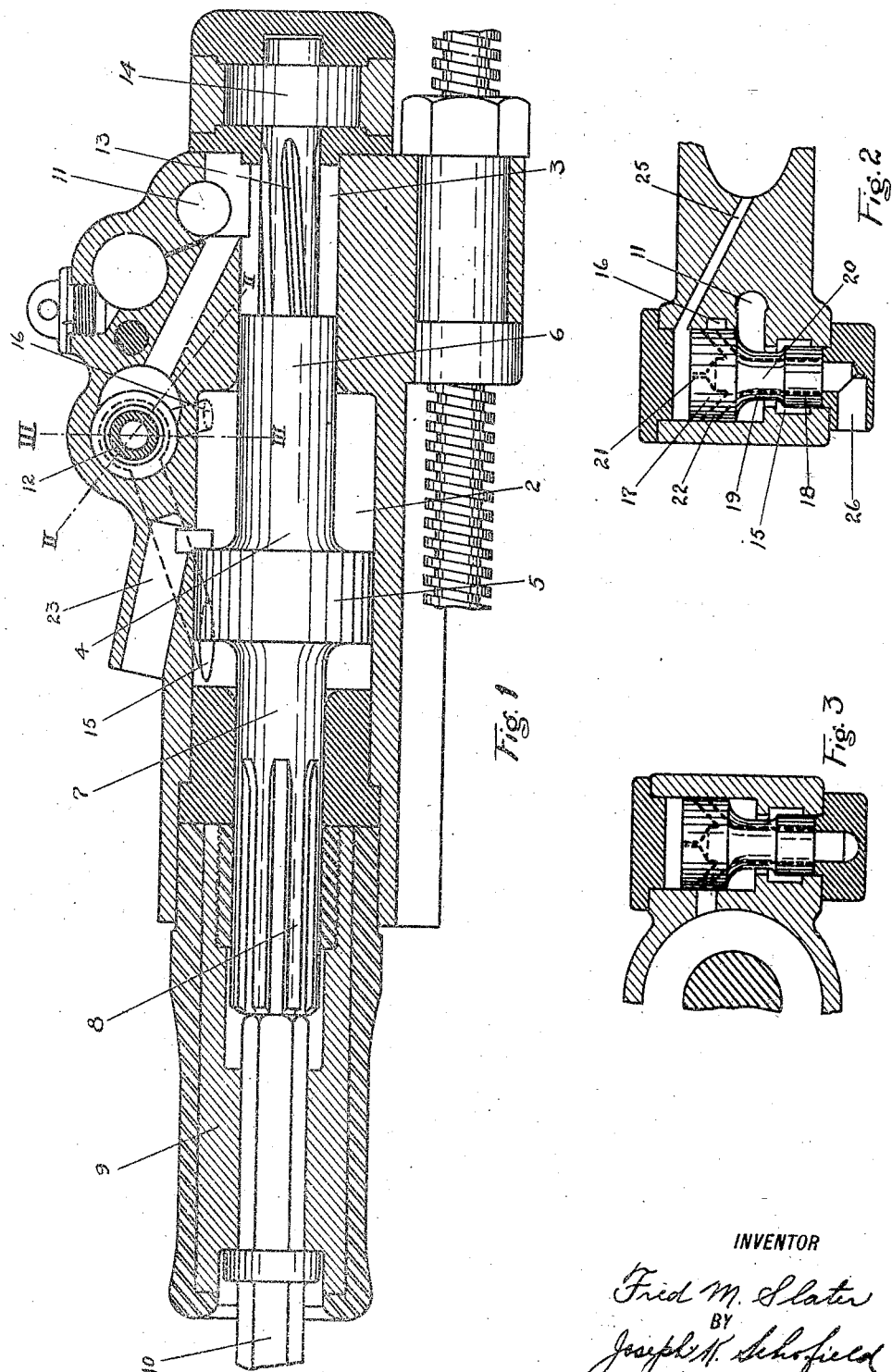
INVENTOR
Fred M. Slater
BY
Joseph N. Schofield
ATTORNEY

F. M. SLATER.
VALVE FOR PERCUSSIVE TOOLS.
APPLICATION FILED MAY 25, 1917.

1,289,285.

Patented Dec. 31, 1918.
2 SHEETS—SHEET 2.

INVENTOR
Fred M. Slater
BY
Joseph K. Schofield
ATTORNEY

UNITED STATES PATENT OFFICE.

FRED M. SLATER, OF EASTON, PENNSYLVANIA, ASSIGNOR TO INGERSOLL-RAND COMPANY, OF JERSEY CITY, NEW JERSEY, A CORPORATION OF NEW JERSEY.

VALVE FOR PERCUSSIVE TOOLS.

1,289,285.  Specification of Letters Patent.  Patented Dec. 31, 1918.

Application filed May 25, 1917. Serial No. 170,824.

*To all whom it may concern:*

Be it known that I, FRED M. SLATER, a citizen of the United States, residing at Easton, in the county of Northampton and State of Pennsylvania, have invented a certain new and useful Improvement in Valves for Percussive Tools, of which the following is a specification.

This invention relates to fluid operated percussive tools, and more particularly to tools of the type wherein the piston has two rearward pressure surfaces and one forward pressure surface, one of the rearward pressure surfaces being subjected to constant pressure and the other two surfaces being subjected to intermittent pressure.

The objects of the present invention are to provide a tool of this type in which the admission of fluid to the intermittently supplied forward and rearward surfaces of the piston is controlled by a valve whereby the admission of fluid to the rearward surface is continued for a longer time during the forward stroke than during the rearward stroke of the piston, an increase in power and efficiency being thus obtained; further, to embrace within the valve controlling the admission of the fluid to the intermittently supplied portions of the cylinder an exhaust valve controlling the opening and closing of auxiliary exhaust ports from the intermittently supplied portions of the cylinder; further, to operate said valve in one direction by fluid pressure admitted against one head of the valve through a piston controlled port and in the other direction by constant pressure against a part of the valve.

With these and other objects in view, my invention consists in the features of construction and operation set forth in the following specification.

Figure 5:
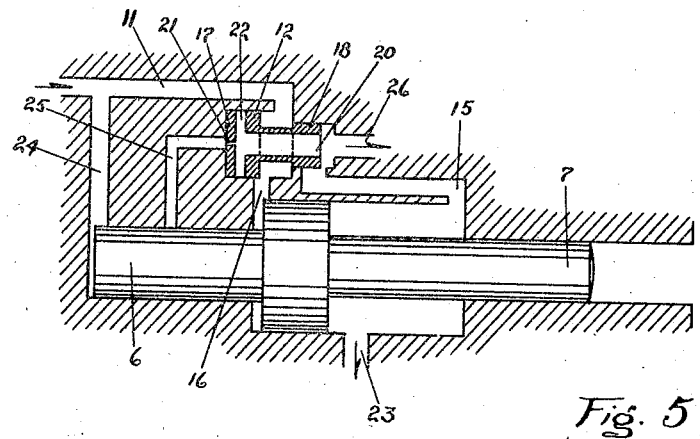
Figure 6:
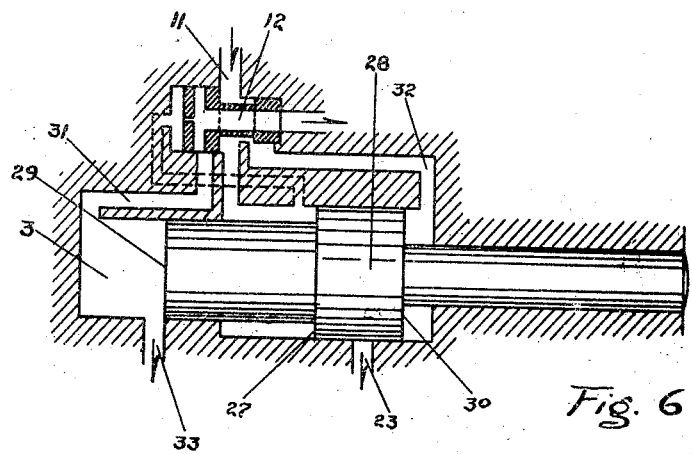

In the drawings annexed hereto and forming a part of this specification,

Figure 1 shows a cross sectional view of the entire tool;

Fig. 2, a section taken on the line II—II of Fig. 1;

Fig. 3, a section taken on the line III—III of Fig. 1;

Fig. 4, a diagrammatic view of the tool the piston being shown at the end of its forward stroke;

Fig. 5, a diagrammatic view of the tool with the piston and valve in another position; and Fig. 6, a slight modification shown diagrammatically.

As shown in the drawings, the tool comprises a cylinder 1 having a forward bore 2 of large diameter and a rearward bore 3 of smaller diameter in which a differential piston 4 having a head 5 fitting the larger portion of the cylinder 2 and a shank portion 6 fitting the smaller portion of the cylinder 3 operates. Extending forwardly from the head 5 of the piston 4 is a drill engaging shank 7 having flutes 8 by means of which the drill chuck and drill 10 are rotated. The piston 4 is operated by fluid pressure supplied to the tool through the inlet 11, which fluid pressure is distributed on either side of the piston head 5 by means of a valve 12 presently to be more fully described. The tool is provided with the usual rifled bar 13, and ratchet 14, by means of which the piston and consequently the drill is rotated, these, however, forming no part of the present invention are shown only in outline.

The smaller bore 3 of the cylinder 1 is continuously in direct communication with the inlet 11 and is therefore subjected to constant pressure which pressure is exerted against the end of the piston shank 6. The motive fluid supplied to the larger bore 2 of the cylinder 1 is intermittently supplied to either end by means of ports 15 and 16 extending from the valve 12 to either end of the bore 2. The valve 12 which is clearly shown in Figs. 2 and 3 will now be more fully described.

This valve 12 comprises two head portions of different diameters 17 and 18, respectively, connected by a neck or reduced portion  Extending practically throughout the central section of the valve 12 is a hole 20 having an opening out through the smaller head 18. Extending from the end face of the larger head 17 to the central hole 20 is a leak port 21, and extending from the circumferential face of the larger head 17 are passages 22 leading to the central hole 20. The central hole 20 of the valve 12 is in communication with atmosphere through port 26.

The large bore 2 of the cylinder 1 is provided with a central constantly open exhaust port 23 opening to atmosphere which port is uncovered by the head 5 of the piston 4 at the end of the stroke of the piston in either direction.

As the operation of my tool will be more obvious from the diagrammatic views of the tool in Figs. 4 and 5, it will be described in connection with these figures. In Fig. 4, the piston 4 is shown at the forward end of its stroke, the valve 12 having been thrown to admit fluid to the forward end of the cylinder bore 2 to retract the piston 4. Fluid is admitted to the tool through the inlet passage 11 and through passage 24 to the rear face of the shank 6 against which a constant pressure is exerted. When the valve is in the position shown fluid passes through the inlet 11 around the reduced portion 19 of the valve 12 to the passage 15 where it exerts pressure against the forward face of the piston head 5 to force the piston rearwardly. As soon as the piston has moved rearwardly a portion of its stroke, the shank 6 of the piston 4 covers the piston controlled port 25 which is open only when the piston 4 is in the forward portion of its stroke. After the piston shank 6 has covered the port 25 the fluid within said passage and in the valve chest pressing against the head 17 of the valve 12 leaks out by means of the leak port 21 through the hole 20 and out through the auxiliary exhaust port 26 to atmosphere. By the time the piston has approached its most rearwardly position the pressure exerted against the head 17 has been greatly reduced so that the pressure constantly exerted against the annulus between the reduced portion 19 and the head 17 is sufficient to overcome it whereupon the valve is forced rearwardly to the position shown in Fig. 5.

Referring to Fig. 5, it will be seen that the valve when in this position closes the passage 15 to the forward face of the piston head 5 and opens the passage 16 admitting fluid to the rearward face, thus forcing the piston forward again. The passage 16 is held open until the piston shank 6 uncovers the port 25 when the valve 12 is thrown to its forward position as shown in Fig. 4, when the above described cycle of events is repeated.

The valve 12 not only controls the admission of fluid to the intermittently supplied portions of the cylinder as above described, but also operates as an auxiliary exhaust valve in a manner to be presently described.

It will be noted that when the valve 12 is in the position shown in Fig. 4, fluid is being admitted to the forward end of bore 2 through passage 15 and fluid is being exhausted from the rear end of bore 2 through the central exhaust port 23. After the port 23 has been closed by the piston head 5 it is desirable to still continue the exhaust from the cylinder until the piston has almost reached its rearward position, in order to prevent too great an air cushion forming which would tend to shorten the stroke of the piston 4 and impair the efficiency of the tool. This auxiliary exhaust is accomplished by means of the holes 22 bored through the head 17 of the valve 12 which are in communication with port 16 when the valve is in the position shown in this figure. It will thus be seen that the exhaust is continued until the valve is thrown to its opposite position, which does not occur until the piston has almost reached the end of its stroke.

With the valve in the position shown in Fig. 5, and while fluid is being admitted to the rear of the bore 2, the exhaust takes place after the central exhaust has been closed through the port 15 and past the smaller head 18 of the valve 12 to the auxiliary exhaust 26.

In Fig. 6 is shown a slight modification of the invention in which constant pressure is exerted against the rear face 27 of the piston head 28, pressure being admitted intermittently to the rear of the piston shank 29 and the front face 30 of the piston head 28 by means of the valve 12 through ports 31 and 32, respectively, in a manner similar to that shown in the form of the invention disclosed in Figs. 1 to 5. In this form of the invention an additional exhaust port 33 is provided for the smaller bore 3 of the cylinder. The operation of the valve in this modification of the invention is in every way similar to that in the other.

It is to be understood that while the present showing and description disclose only certain specific embodiments of the present invention, other forms and modifications are included within the spirit and scope thereof, as expressed in the appended claims.

What I claim is:

1. A valve for percussive tools comprising two head portions of different diameter, a neck portion connecting said head portions, an exhaust port extending from the cylindrical surface of the larger head portion to the central portion of the opposite end of the valve, and a leak port extending from said larger head portion to said exhaust passage.

2. In a fluid operated percussive tool, a cylinder, a piston therein having two rear pressure areas and one forward pressure area, a valve comprising two head portions of different diameters, a neck portion connecting said head portions, the head portions on each side of the neck portion controlling the opening and closing of communication between the ends of the cylinder and the fluid supply, an exhaust passage through said valve to exhaust fluid from one end of said cylinder, said valve having a leak port intercepting said exhaust passage, said valve being thrown in one direction by fluid pressure exerted intermittently against the larger of said heads and in the opposite direction by constant pressure against the annulus formed by the larger head and neck of the valve.

3. In a fluid operated percussive tool, a cylinder, a differential piston therein having two rearward pressure areas and one forward pressure area, means for maintaining constant fluid pressure on one rearward face of the piston, a differential valve for alternatively controlling the supply and exhaust from two of said pressure areas, said cylinder provided with a piston controlled port for intermittently supplying motive fluid from a constantly supplied portion of the cylinder to the larger end of the valve to move the valve in one direction.

4. In a fluid operated percussive tool, a cylinder, a piston therein having a head and a shank portion, a differential valve for alternatively controlling the supply and exhaust from pressure areas of said piston head, said cylinder provided with a piston controlled port to intermittently admit motive fluid against the larger head of the valve to move said valve in one direction, and means to exhaust said motive fluid through said valve.

5. In a fluid operated percussive tool, a cylinder, a piston therein, a valve to control the supply and exhaust of motive fluid comprising two head portions of different diameters, a neck portion connecting said head portions, said cylinder provided with a piston controlled port to intermittently admit motive fluid against the larger head of the valve to move the valve in one direction and an exhaust passage through said valve to exhaust fluid from one end of said cylinder, said valve having a leak port for exhausting said intermittently supplied fluid.

6. In a fluid operated percussive tool, a cylinder, a piston therein, a valve comprising two head portions of different diameters, a neck connecting said head portions, the portions adjacent to the neck serving to open and close communication between a fluid supply and the ends of said cylinder, an exhaust passage through the valve to exhaust motive fluid from one end of said cylinder, said valve being moved in one direction by motive fluid pressure constantly exerted against the annulus formed by the larger head and the neck of the valve, and piston controlled means for intermittently supplying motive fluid pressure to the larger end of the valve to move said valve in the opposite direction, said valve having a leak port for exhausting said intermittently supplied motive fluid from the larger end of the valve.

7. In a fluid operated percussive tool, a cylinder, a piston therein, a valve having heads of different diameter adapted to be thrown in one direction by the pressure of motive fluid applied to the portion between the heads, piston controlled means for intermittently applying motive fluid to the larger end of the valve to move said valve in the other direction, said valve having a leak port for exhausting said pressure, said valve controlling ports for alternately supplying and exhausting the motive fluid from the opposite ends of the cylinders.

8. In a fluid operated percussive tool, a cylinder, a piston therein having two rear pressure areas and one forward pressure area, a valve comprising two head portions of different diameters, a neck portion connecting said head portions, the head portions on each side of the neck portion controlling the opening and closing of communication between the ends of the cylinder and the fluid supply, an exhaust passage through said valve to exhaust fluid from one end of said cylinder, said valve having a leak port extending from the face of the larger head to the exhaust, said valve being thrown in one direction by fluid pressure exerted intermittently against the larger of said heads and in the opposite direction by constant pressure against the annulus formed by the larger head and neck of the valve.

9. In a fluid operated percussive tool, a cylinder, a piston therein having a head and a shank portion, a differential valve for alternatively controlling the supply and exhaust from pressure areas of said piston head, said cylinder provided with a piston controlled port to intermittently admit motive fluid against the larger head of the valve to move said valve in one direction, and constantly open means for slowly exhausting said motive fluid.

10. A valve for percussive tools comprising two head portions, a neck portion connecting said head portions, said neck portion opening and closing communication between either end of the cylinder and the fluid supply, said valve having a passage therethrough permitting an intermittent communication between an auxiliary exhaust port in one end of the cylinder and the atmosphere and said valve having a leak port intercepting said passage.

11. A valve for percussive tools comprising two head portions, a neck portion connecting said head portions, said neck portion opening and closing communication between either end of the cylinder and the fluid supply, said valve having a passage therethrough permitting an intermittent communication between an auxiliary exhaust port in one end of the cylinder and the atmosphere and said valve having a leak port extending from the face of one head to the exhaust.

12. A valve for percussive tools comprising two head portions of different diameter, a neck portion connecting said head portions, said neck portion opening and closing communication between either end of the cylinder and the fluid supply, said valve having a passage therethrough permitting an intermittent communication between an auxiliary exhaust port in one end of the cylinder and the atmosphere and said valve having a leak port extending from the face of the larger head to the exhaust.

13. In a fluid operated percussive tool, a cylinder, a piston therein having two rear pressure areas and one forward pressure area, a valve comprising two head portions of different diameters, a neck portion connecting said head portions, the head portions on each side of the neck portion controlling the opening and closing of communication between the ends of the cylinder and the fluid supply, an exhaust passage through said valve to exhaust fluid from one end of said cylinder, said valve having a leak port extending from the face of the larger head to the exhaust, said valve being thrown in one direction by fluid pressure exerted intermittently against the larger of said heads and in the opposite direction by constant pressure against the annulus formed by the larger head and neck of the valve as the pressure on the large head falls due to the reduction in pressure of the motive fluid intermittently supplied against said head escaping through said leak port.

In testimony whereof, I have hereunto set my hand.

FRED M. SLATER.